United States Patent
Horiuchi et al.

(10) Patent No.: US 8,262,232 B2
(45) Date of Patent: Sep. 11, 2012

(54) DISPLAY DEVICE EMITTING A LIGHT FLUX AND MOBILE APPARATUS INCLUDING THE DISPLAY DEVICE

(75) Inventors: Kazuo Horiuchi, Kanagawa-ken (JP); Naotada Okada, Kanagawa-ken (JP); Haruhiko Okumura, Kanagawa-ken (JP); Takashi Sasaki, Kanagawa-ken (JP); Aira Hotta, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 390 days.

(21) Appl. No.: 12/560,675

(22) Filed: Sep. 16, 2009

(65) Prior Publication Data

US 2010/0066984 A1     Mar. 18, 2010

(30) Foreign Application Priority Data

Sep. 17, 2008  (JP) ................. 2008-238659
Aug. 24, 2009  (JP) ................. 2009-192837

(51) Int. Cl.
   *G03B 21/14*    (2006.01)
   *G03B 21/26*    (2006.01)

(52) U.S. Cl. .......................... 353/97; 353/30

(58) Field of Classification Search ............ 353/97, 353/88, 30, 31, 13, 7; 359/738, 739, 462, 359/466, 618, 629, 630, 632, 633, 458, 467–477; 250/208.1, 221; 351/209–211; 345/7–9; 348/42, 51–60; 352/57; 349/15

See application file for complete search history.

(56) References Cited

U.S. PATENT DOCUMENTS 5,855,425 A *   1/1999   Hamagishi ................. 353/7
2007/0097319 A1 *   5/2007   McKay et al. ............. 353/7

FOREIGN PATENT DOCUMENTS

JP     2-294615     12/1990
JP     8-271827     10/1996

* cited by examiner

*Primary Examiner* — Pascal M Bui Pho
(74) *Attorney, Agent, or Firm* — Oblon, Spivak, McClelland, Maier & Neustadt, L.L.P.

(57) ABSTRACT

A display device is provided that includes: a projection unit emitting a light flux including image information; and a divergence angle controlling unit controlling a divergence angle of the light flux emitted from the projection unit to not more than a prescribed angle. The divergence angle controlling unit includes a transmission unit transmitting the light flux emitted from the projection unit and a light shielding unit shielding part of the light flux, and the part of the light flux is shielded by the light shielding unit so that the divergence angle of the light flux is controlled to not more than a prescribed angle.

19 Claims, 13 Drawing Sheets

DISPLAY DEVICE EMITTING A LIGHT FLUX AND MOBILE APPARATUS INCLUDING THE DISPLAY DEVICE

CROSS-REFERENCE TO RELATED APPLICATIONS

This application is based upon and claims the benefit of priority from the prior Japanese Patent Application No. 2008-238659, filed on Sep. 17, 2008 and the prior Japanese Patent Application No. 2009-192837, filed on Aug. 24, 2009; the entire contents of which are incorporated herein by reference.

BACKGROUND OF THE INVENTION

1. Field of the Invention

This invention relates to a display device and a mobile apparatus.

2. Background Art

What is called a head-up display (HUD) is known, which uses a display device, and thereby displays various kinds of information on a front glass (windshield) of a mobile apparatus such as a vehicle and aircraft to cause an operator to view the image information together with the image of the outside background field.

As to the head-up display, the displayed optical image of image information may be viewed as a double image. When the optical image of image information is viewed as a double image, visibility is reduced.

Therefore, a technique is proposed that prevents the optical image of image information from being viewed as a double image (see JP-A-8-271827(Kokai)(1986) and JP-A-2-294615(Kokai)(1990)).

JP-A-8-271827 (1986) provides a film adjusting the direction of polarization, and configures the front surface and the back surface of a front glass so that they are nonparallel, and thereby prevents the optical image of image information from being viewed as a double image.

JP-A-2-294615 (1990) provides a film having birefringence in a front glass or inside a cabin to prevent the optical image of image information from being viewed as a double image.

However, such techniques need to make the shape of a front glass in the thickness direction a unique shape and/or to provide a special film in a front glass or inside a cabin. Therefore, they may increase cost and significantly decrease versatility.

SUMMARY OF THE INVENTION

According to an aspect of the invention, there is provided a display device including: a projection unit emitting a light flux including image information; and a divergence angle controlling unit controlling a divergence angle of the light flux emitted from the projection unit to not more than a prescribed angle, the divergence angle controlling unit including a transmission unit transmitting the light flux emitted from the projection unit and a light shielding unit shielding part of the light flux, and the part of the light flux being shielded by the light shielding unit so that the divergence angle of the light flux is controlled to not more than a prescribed angle.

According to another aspect of the invention, there is provided a mobile apparatus including: the display device including: a projection unit emitting a light flux including image information; and a divergence angle controlling unit controlling a divergence angle of the light flux emitted from the projection unit to not more than a prescribed angle, the divergence angle controlling unit including a transmission unit transmitting the light flux emitted from the projection unit and a light shielding unit shielding part of the light flux, and the part of the light flux being shielded by the light shielding unit so that the divergence angle of the light flux is controlled to not more than a prescribed angle; and a projection plate onto which image information is projected by the display device.

DETAILED DESCRIPTION OF THE INVENTION

Figure 1:
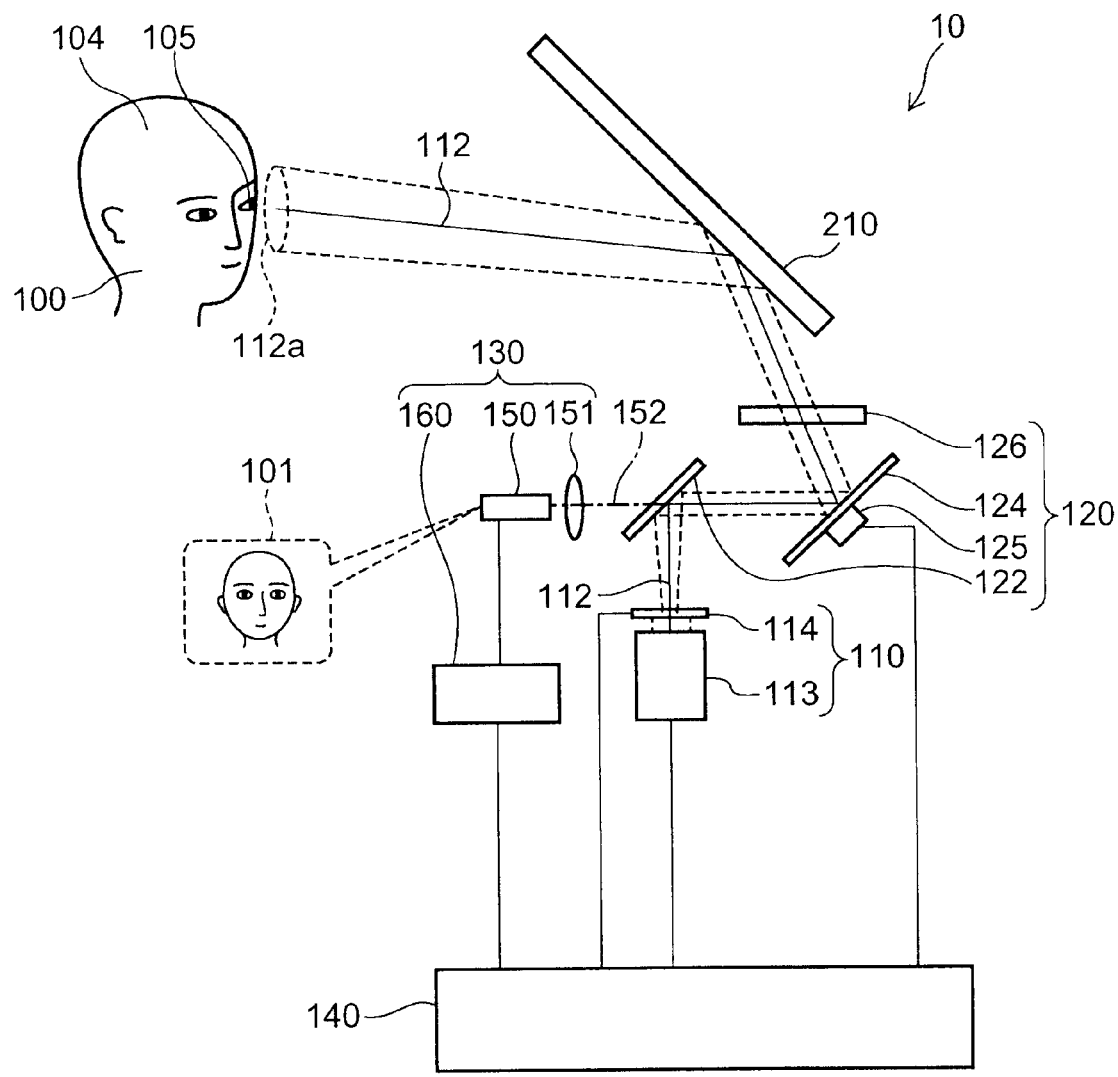
FIG. 1 is a schematic view for illustrating a display device according to a first embodiment.

Embodiments of the present invention will now be illustrated with reference to the drawings. In the drawings, like components are marked with identical reference signs, and a detailed description is omitted as appropriate.

FIG. 1 is a schematic view for illustrating a display device according to a first embodiment.

As illustrated in FIG. 1, a display device 10 according to this embodiment includes a light flux generating unit 110, a light flux controlling unit 120, an image detecting unit 130, and a control unit 140. A light flux 112 generated in the light flux generating unit 110 includes image information. The light flux 112 generated in the light flux generating unit 110 reaches a head 104 of an occupant 100 via a projection plate 210.

The light flux generating unit 110 includes a projection unit 113 and a divergence angle controlling unit 114 provided opposed to a side of the projection unit 113 from which a light flux is emitted.

The projection unit 113 emits the light flux 112 including image information. The projection unit 113 projects various kinds of image information such as operating information as an optical image. The projection unit 113 may be, for example, a liquid-crystal projector, a digital light processing (DLP) projector, and the like. The liquid-crystal projector includes a liquid-crystal panel, a light source, and the like.

This projector transmits a light flux from the light source through the liquid-crystal panel to project the image information as an optical image. The digital light processing projector includes a digital micromirror device (DMD) and a light source. This projector reflects a light flux from the light source at a fine independently-moving mirror provided on a silicon substrate to project the image information as an optical image. However, the projection unit 113 is not limited to those illustrated, but some capable of converting an electrical signal into an optical image may be selected as appropriate.

The divergence angle controlling unit 114 controls the divergence angle of the light flux 112 emitted from the projection unit 113 to not more than a prescribed angle, and thereby prevents the optical image of image information from being viewed as a double image. The divergence angle controlling unit 114 may be, for example, some including: a transmission unit which transmits the light flux 112 emitted from the projection unit 113; and a light shielding unit which shields part of the light flux 112, where part of the light flux 112 is shielded by the light shielding unit so that the divergence angle of the light flux 112 is controlled to not more than a prescribed angle. The details of the divergence angle controlling unit 114 are described later.

The light flux controlling unit 120 includes a first mirror 122, a second mirror 124, a lens 126, and a driving unit 125. The light flux controlling unit 120 controls the direction of the light flux 112 to cause the light flux 112 to enter the position of a specific region (in particular, the position of an eye 105) of the occupant 100.

The first mirror 122 is configured to reflect part of an incident light flux and transmit part thereof. A configuration is possible in which visible light is reflected and infrared light is transmitted.

The second mirror 124 reflects the reflected light from the first mirror 122 to change the direction of the light flux 112.

The driving unit 125 is connected to the second mirror 124. The position of the second mirror 124 can be changed by the driving unit 125. Consequently, the position of a illumination region 112a can be changed by changing the position of the second mirror 124. For example, the position of the illumination region 112a can be changed in the horizontal and vertical directions by changing the angle etc. of the second mirror 124.

The lens 126 collects the reflected light from the second mirror 124. The lens 126 is not necessarily required, but may be appropriately provided as needed.

The positions of the projection unit 113, the divergence angle controlling unit 114, the first mirror 122, the second mirror 124, and the lens 126 can be individually adjusted at the time of installation, maintenance, and the like.

The image detecting unit 130 includes an imaging unit 150, an adjusting lens 151, and an image processing unit 160.

The imaging unit 150 takes an image 101 of the occupant 100 via the projection plate 210, the lens 126, the second mirror 124, and the first mirror 122. The imaging unit 150 may be, for example, a CCD (charge coupled device) camera, a CMOS (complementary metal oxide semiconductor) sensor, and the like. However, the imaging unit 150 is not limited to them, but some capable of converting an image information to an electrical signal may be selected as appropriate. A mirror that reflects visible light and transmits infrared light is preferably used as the first mirror 122. It is preferable that the imaging unit 150 can take the image 101 of the occupant 100 with infrared light. Such a configuration can reduce unnecessary noise in the image.

The adjusting lens 151 is provided between the imaging unit 150 and the first mirror 122. The adjusting lens 151 collects the light flux emitted from the first mirror 122 to adjust the size and focus of the image. The adjusting lens 151 is not necessarily required, but may be appropriately provided as needed.

The image processing unit 160 performs image processing to analyze the position of a specific region of the occupant 100 which has been imaged by the imaging unit 150. For example, the image processing unit 160 can specify the position of eyeballs of both eyes, the position of a nose, the position of a mouth, and the like as a feature point of the face of the occupant 100, and thereby analyze the position of the head, particularly an eye, of the occupant 100. By performing image processing, the position of a specific region (in particular, the position of the eye 105) of the occupant 100 can be acquired.

The projection unit 113, the image processing unit 160, and the driving unit 125 are electrically connected to the control unit 140. As described later, in the case where the divergence angle controlling unit 114 is provided with a driving unit (for example, a driving unit 118 illustrated in FIGS. 5A and 5B), the driving unit is electrically connected to the control unit 140.

The control unit 140 controls the driving unit 125 based on the position of a specific region (in particular, the position of the eye 105) of the occupant 100 which has been analyzed in the image processing unit 160. That is, the control unit 140 controls the driving unit 125 to change the angle etc. of the second mirror 124, and thereby causes the light flux 112 to enter the position of the specific region (in particular, the position of the eye 105) of the occupant 100.

As described above, the display device 10 includes: the imaging unit 150 which takes the image 101 of the occupant 100; and the light flux controlling unit 120 which causes the light flux 112 to enter the position of a specific region of the occupant 100 based on the image 101 taken.

Here, when the divergence angle of the light flux 112 emitted from the projection unit 113 is made not more than a prescribed angle by the divergence angle controlling unit 114, the illumination region 112a is smaller. However, in this embodiment, the light flux 112 can be caused to enter the position of a specific region (in particular, the position of the eye 105) of the occupant 100, and visibility is therefore not reduced even when the illumination region 112a is small. Further, even in such cases as where the occupant 100 moves his head from side to side and up and down, the incident position of the light flux 112 (the position of the illumination region 112a) can be caused to follow the movement.

The control unit 140 causes the projection unit 113 to emit the light flux 112 including image information. In the case where the divergence angle controlling unit 114 is provided with a driving unit (for example, the driving unit 118 illustrated in FIGS. 5A and 5B), the control unit 140 causes the divergence angle controlling unit 114 to control the divergence angle. The control of the divergence angle is described later.

A not-illustrated image display unit may be electrically connected to the control unit 140. Then, for example, a crossbar indicating the center of the illumination region 112a and the like may be caused to be displayed on the display screen of the not-illustrated image display unit. This can facilitate the position adjustment between the position of a specific region (for example, the position of the one eye 105) of the occupant 100 and the position of the illumination region 112a.

The projection plate 210 may be a member capable of reflecting the light flux 112. For example, it may be a windshield of a mobile apparatus such as a vehicle. In this case, a not-illustrated high-reflection unit may be provided on part of the front glass to reflect the light flux 112 on that region.

A head-up display (HUD) can be formed by mounting the display device 10 in a mobile apparatus such as a vehicle and using a windshield as the projection plate 210.

The divergence angle controlling unit 114 will be further illustrated.

First, it is illustrated that an optical image of image information is viewed as a double image.

Figure 2:
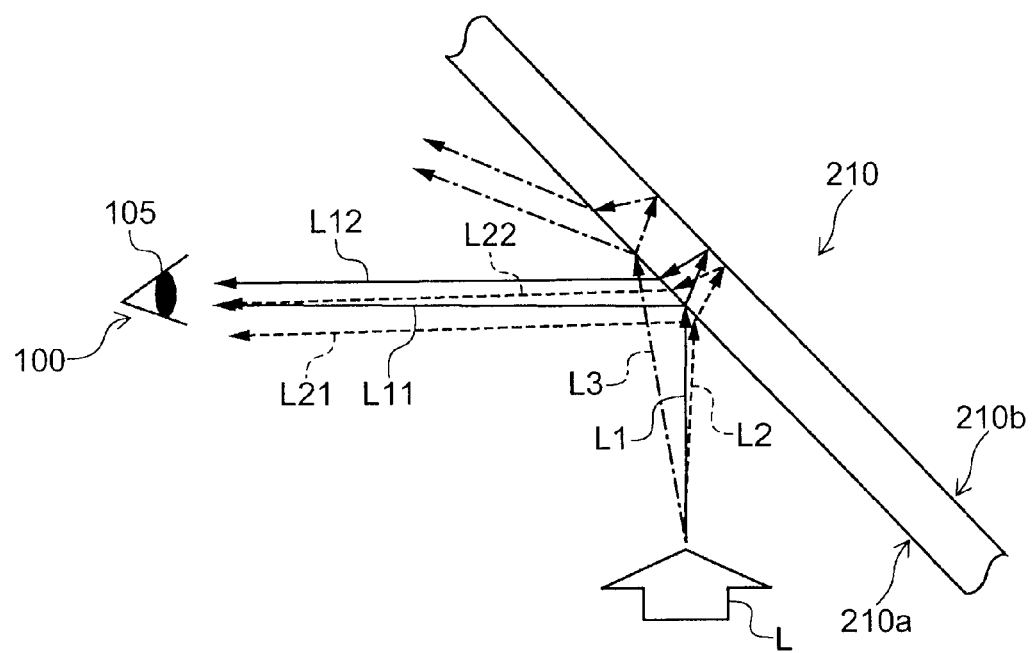
FIG. 2 is a schematic view for illustrating a situation where an optical image of image information is viewed as a double image.

FIG. 2 is a schematic view for illustrating a situation where an optical image of image information is viewed as a double image.

Figure 3A:
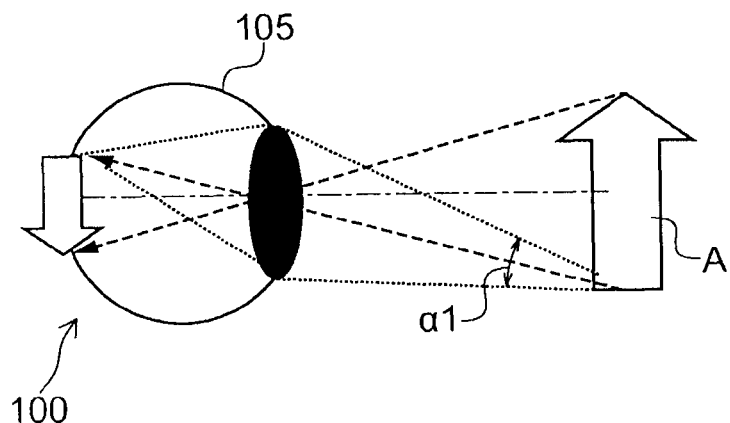
FIGS. 3A and 3B are schematic views for illustrating a situation where an occupant visually identifies an object.
Figure 3B:
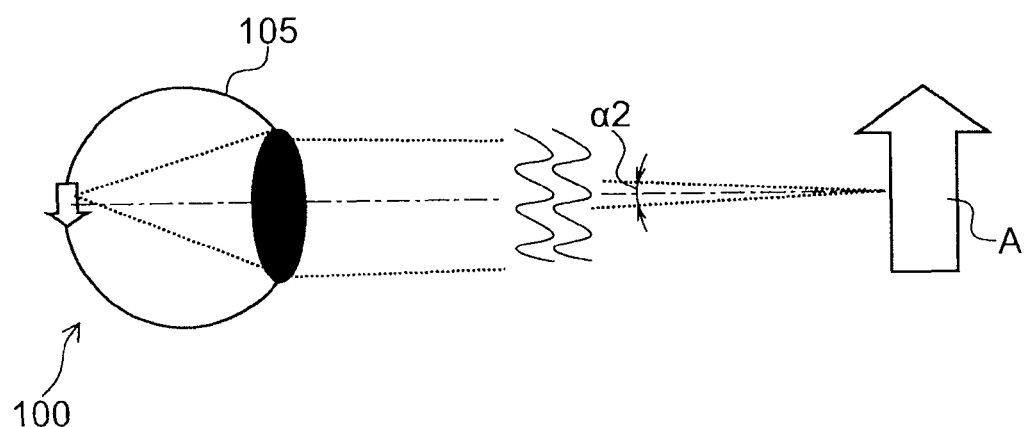

FIGS. 3A and 3B are schematic views for illustrating a situation where an occupant visually identifies an object. FIG. 3A illustrates a situation where the occupant visually identifies a near object, and FIG. 3B illustrates a situation where the occupant visually identifies a far object.

As illustrated in FIG. 2, light L emitted from a not-illustrated diffused light source enters the projection plate 210 (for example, a windshield and the like) from a plurality of directions. Among them, part of light L1 is reflected on a front surface 210a of the projection plate 210, and a reflected light L11 thereof enters the eye 105 of the occupant 100. Further, part of the light L1 goes straight in the projection plate 210 and is reflected on a back surface 210b of the projection plate 210, and a reflected light L12 thereof enters the eye 105 of the occupant 100. The reflected light L11 and the reflected light L12 are generally parallel to each other.

In the case where the display device 10 is used for a head-up display and the like, an optical image of various kinds of image information such as operating information is viewed as a virtual image on a virtual image face a few meters ahead.

Here, as illustrated in FIG. 3A, in the case where a near object A is visually identified, an acceptance angle α1 is great. Therefore, the occupant 100 visually identifies the object A based on the distance and the incident direction. On the other hand, as illustrated in FIG. 3B, in the case where a far object A is visually identified, an acceptance angle α2 is small. Therefore, the occupant 100 visually identifies the object A based on the incident direction.

More specifically, when the optical image (virtual image) of image information is distant as in those instances where the display device 10 is used for a head-up display and the like, then the occupant 100 visually identifies the optical image of image information based on the incident direction. In this case, since the reflected light L11 and the reflected light L12 are generally parallel to each other, the incident directions are identical. Therefore, the optical image of image information is not viewed as a double image.

On the other hand, part of the light L2 of which the optical axis is shifted by a certain angle from the optical axis of the light L1 goes straight in the projection plate 210, and reflects on the back surface 210b of the projection plate 210. Then, a reflected light L22 thereof enters the eye 105 of the occupant 100. Meanwhile, reflected light L21 reflected on the front surface 210a of the projection plate 210 does not enter the eye 105 of the occupant 100. Also, light L3 of which the optical axis is significantly shifted from the optical axis of the light L1 does not enter the eye 105 of the occupant 100.

Therefore, since the reflected light L22, which has an incident direction different from that of the reflected light L11 and the reflected light L12, enters the eye 105 of the occupant 100, the optical image of image information is viewed as a double image. For example, in the case of what is illustrated in FIG. 2, the optical image is viewed as a vertical double image.

In this case, if the angle between the optical axis of the light L1 and the optical axis of the light L2 is below the resolution of the eye 105 of the occupant 100, then the optical image of image information is not viewed as a double image. In this case, when the eyesight is approximately 1.0, the resolution of human eye is about 0.29 mrad. On the other hand, a certain level of divergence angle is necessary in regard to forming a virtual image by reflection on the projection plate 210, ensuring a certain size of the illumination region 112a, and the like.

Therefore, it is very difficult to make the angle between the optical axis of the light L1 and the optical axis of the light L2 lower than the resolution of the eye 105 of the occupant 100.

In particular, in the case of a diffused light source such as an LED (light emitting diode) and a lamp, since the divergence angle is great, it is very difficult to make it below the resolution of the eye 105 of the occupant 100.

As a result of the investigation by the inventors and others, it has been found that, if the divergence angle of the light flux 112 emitted from the projection unit 113 is kept down to a prescribed angle or less, then the optical image of image information can be prevented from being viewed as a double image.

The finding obtained by the inventors and others will now be described, while taking the case for example where the display device 10 is used for a head-up display (HUD).

The magnitude of divergence angle is determined based on the distance from the projection unit 113 (a light source) and the size of the illumination region 112a. For example, in the case of a common head-up display (HUD), the distance from the projection unit 113 along the optical path is about three meters. In such a case, when the size of the illumination region 112a is made eight millimeters in diameter, the magnitude of divergence angle is 1.33 mrad in half angle.

According to the finding obtained by the inventors and others, for a common head-up display having a distance from the projection unit 113 along the optical path of about three meters, the optical image of image information can be prevented from being viewed as a double image when the magnitude of divergence angle is made less than 1.4 mrad in half angle.

Therefore, for a common head-up display having a distance from the projection unit 113 along the optical path of about three meters, the optical image of image information can be prevented from being viewed as a double image when the size of the illumination region 112a is made not more than eight millimeters in diameter.

In the case where the display device 10 is used for some capable of ensuring a long distance from the projection unit 113 (a light source), the size of the illumination region 112a can be larger than that described above.

To prevent the optical image of image information from being viewed as a double image, this embodiment has a configuration in which the divergence angle controlling unit 114 is provided opposed to the side of the projection unit 113 from which a light flux is emitted. Further, the divergence angle of the light flux 112 emitted from the projection unit 113 is controlled by the divergence angle controlling unit 114.

Figure 4A:
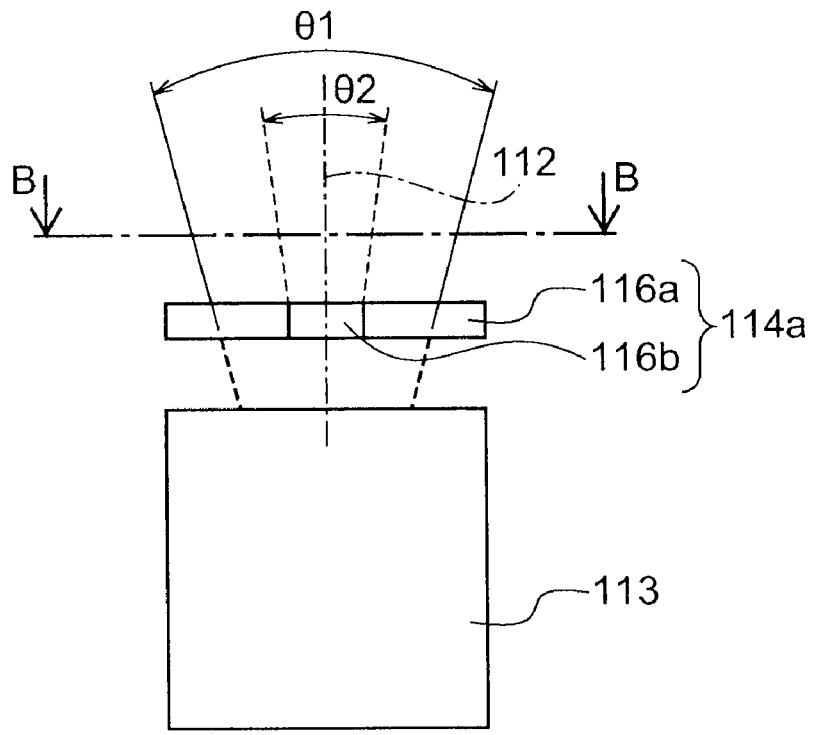
FIGS. 4A and 4B are schematic views for illustrating a divergence angle controlling unit.
Figure 4B:
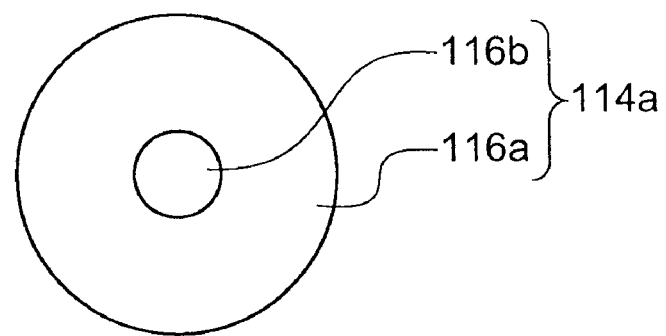

FIGS. 4A and 4B are schematic views for illustrating a divergence angle controlling unit. FIG. 4A is a schematic cross-sectional view for illustrating the divergence angle controlling unit, and FIG. 4B is a fragmentary view taken in the direction of the arrows B-B of FIG. 4A. FIGS. 4A and 4B illustrate the case where the value of divergence angle is controlled fixedly.

As illustrated in FIGS. 4A and 4B, a divergence angle controlling unit 114a includes a light shielding unit 116a and a transmission unit 116b. The light shielding unit 116a is formed of an opaque such as metal, and shields part of the light flux 112 emitted from the projection unit 113. The transmission unit 116b transmits the light flux 112 emitted from the projection unit 113. The transmission unit 116b may be a transparent body such as glass, or be a hole. The cross-section dimension of the transmission unit 116b in a direction generally orthogonal to the direction of the light flux (hereinafter, referred to simply as a "cross-section-direction dimension") is smaller than the cross-section dimension of the light flux 112 emitted from the projection unit 113 in the direction orthogonal to the axis of the light flux 112. Accordingly, the light flux 112 emitted from the projection unit 113 is partly shielded by the light shielding unit 116a. Part of the light flux 112 passes through the transmission unit 116b, and is emitted toward the first mirror 122.

The divergence angle decreases by shielding part of the light flux 112 emitted from the projection unit 113. More specifically, a divergence angle θ2 at the time of passing through the transmission unit 116b is smaller than a divergence angle θ1 at the time of being emitted from the projection unit 113. The divergence angle θ2 at the time of passing through the transmission unit 116b can be changed by changing the cross-section-direction dimension of the transmission unit 116b. Therefore, the divergence angle θ2 can be made not more than a prescribed angle by making the cross-section-direction dimension of the transmission unit 116b an appropriate value. Thus, by making the divergence angle θ2 not more than the prescribed angle, the optical image of image information can be prevented from being viewed as a double image.

In the case where the display device 10 is used in a state where, for example, the posture for viewing is nearly fixed as in the case of a head-up display (HUD), the cross-section-direction dimension of the transmission unit 116b can be determined in the design phase. That is, the value of the divergence angle θ2 can be controlled fixedly while fixing the cross-section-direction dimension of the transmission unit 116b. Such a configuration can reduce cost. In the case where the display device 10 is mounted in a mobile apparatus such as a vehicle, vibration may be transmitted to the divergence angle controlling unit 114a. However, since the divergence angle controlling unit 114a has no complex mechanism, the generation of failure can be reduced.

Figure 5A:
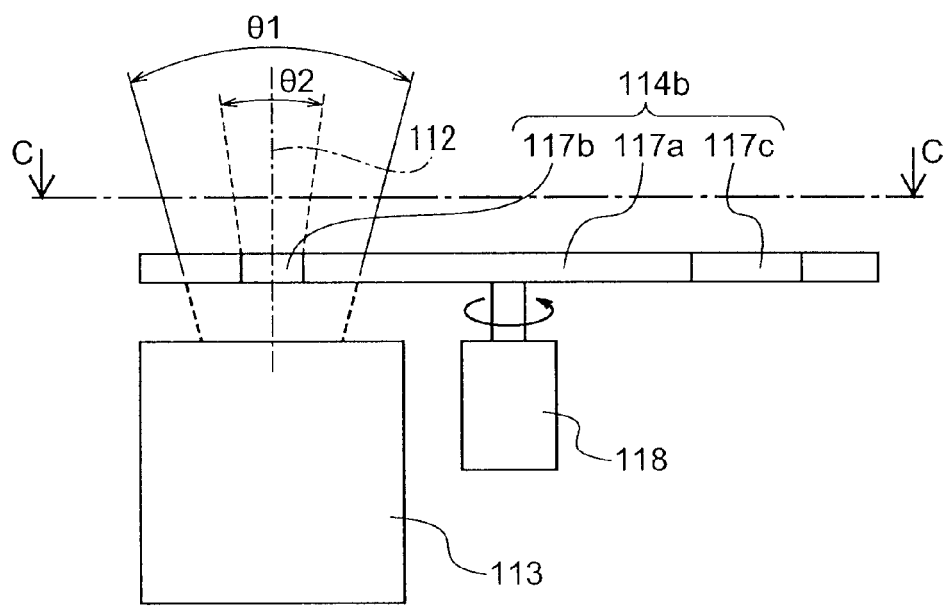
FIGS. 5A and 5B are schematic views for illustrating a divergence angle controlling unit according to another embodiment.
Figure 5B:
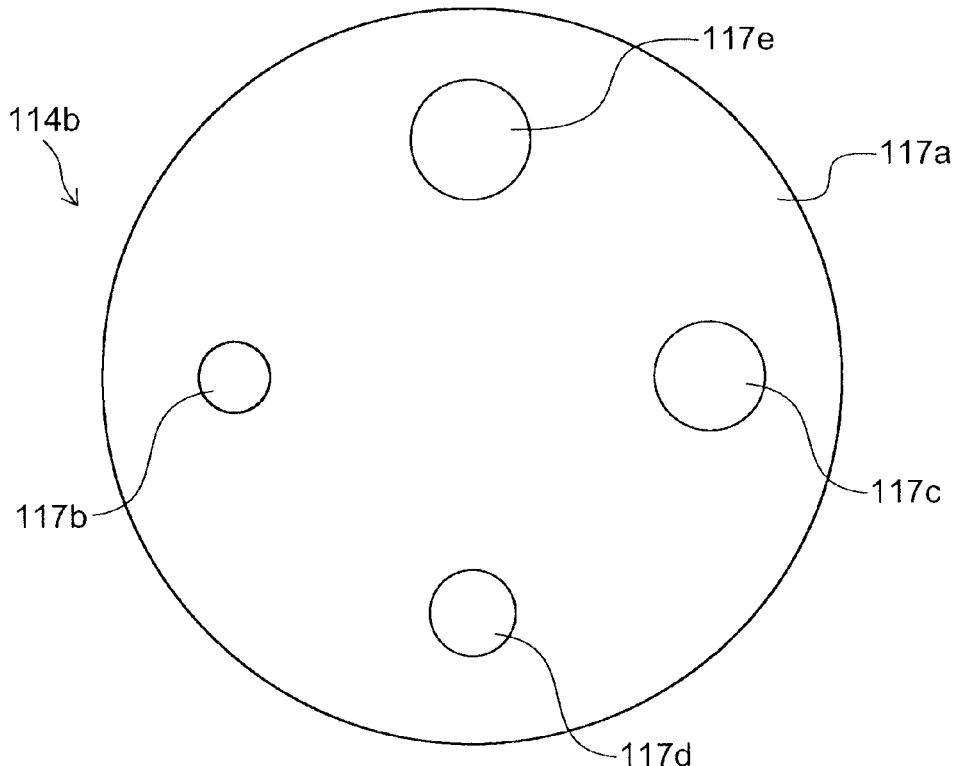

FIGS. 5A and 5B are views for illustrating a divergence angle controlling unit according to another embodiment. FIG. 5A is a schematic cross-sectional view for illustrating the divergence angle controlling unit, and FIG. 5B is a fragmentary view taken in the direction of the arrows C-C of FIG. 5A. FIGS. 5A and 5B illustrate the case where the value of divergence angle is controlled variably.

As illustrated in FIGS. 5A and 5B, a divergence angle controlling unit 114b includes a light shielding unit 117a and transmission units 117b to 117e. Further, the divergence angle controlling unit 114b is provided with a driving unit 118 which rotates the divergence angle controlling unit 114b. The driving unit 118 and the control unit 140 are electrically connected to each other. The cross-section-direction dimensions of the transmission units 117b to 117e are different from each other. The transmission units 117b to 117e are provided on a concentric circle having a center identical to the rotating center of the divergence angle controlling unit 114b. The dimension, number, layout position, and the like of the transmission units 117b to 117e are not limited to those illustrated, but may be modified as appropriate.

The light shielding unit 117a is formed of an opaque such as metal, and shields part of the light flux 112 emitted from the projection unit 113. The transmission units 117b to 117e transmit the light flux 112 emitted from the projection unit 113. The transmission units 117b to 117e may be a transparent body such as glass, or be a hole.

The cross-section-direction dimensions of the transmission units 117b to 117e are smaller than the cross-section dimension of the light flux 112 emitted from the projection unit 113 in the direction orthogonal to the axis of the light flux 112. Therefore, the light flux 112 emitted from the projection unit 113 is partly shielded by the light shielding unit 117a. Part of the light flux 112 passes through the transmission unit 117b, 117c, 117d or 117e, and is emitted toward the first mirror 122.

The divergence angle decreases by shielding part of the light flux 112 emitted from the projection unit 113. More specifically, the divergence angle θ2 at the time of passing through the transmission units 117b to 117e is smaller than the divergence angle θ1 at the time of being emitted from the projection unit 113. The divergence angle θ2 at the time of passing through the transmission units 117b to 117e can be changed by changing the cross-section-direction dimension of the transmission units 117b to 117e. To this end, the present aspect has a configuration in which the transmission units 117b to 117e have different cross-section-direction dimensions, and can be selected as appropriate to make the divergence angle θ2 not more than a prescribed angle. In this case, an appropriate transmission unit 117b, 117c, 117d or 117e can be selected, by driving the driving unit 118 based on an electrical signal from the control unit 140 to rotate the divergence angle controlling unit 114b. In the present aspect, the driving unit 118 serves as a selection unit that selects an appropriate transmission unit from among the plurality of transmission units. That is, the divergence angle controlling unit 114b includes: the plurality of transmission units 117b to 117e having different cross-section-direction dimensions (cross-section dimensions in a direction generally orthogonal to the direction of the light flux); and the selection unit selecting an appropriate transmission unit from among these plurality of transmission units 117b to 117e. In this case, the occupant 100 may recognize the state of the optical image of image information and input necessary information into the control unit 140, also by which an appropriate transmission unit can be selected.

As described above, the divergence angle θ2 can be made not more than a prescribed angle by selecting the appropriate transmission unit 117b, 117c, 117d or 117e. Thus, by making the divergence angle θ2 not more than the prescribed angle, the optical image of image information can be prevented from viewed as a double image. The present aspect can control the divergence angle θ2 to not more than a prescribed angle even when the condition for installation of the display device 10 or the like changes.

Figure 6A:
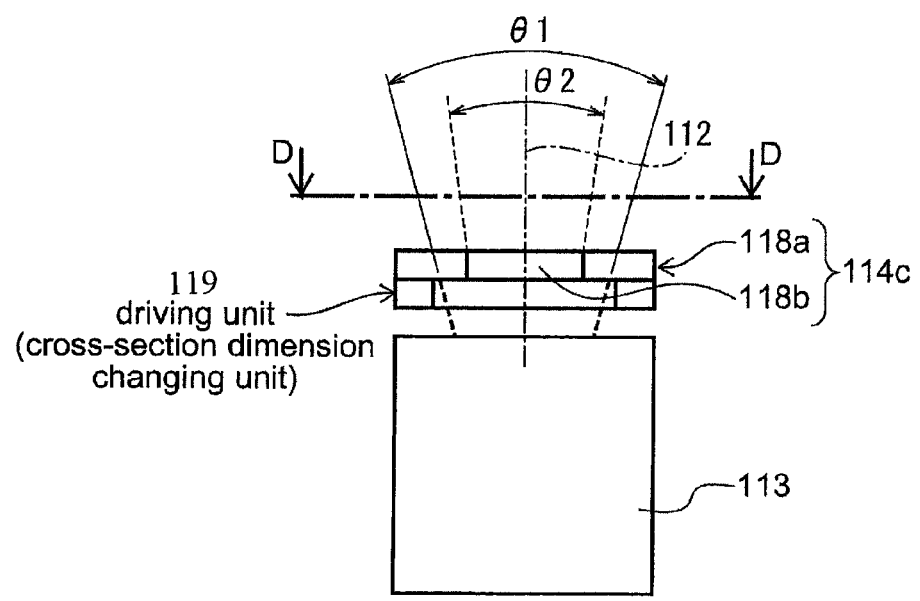
FIGS. 6A and 6B are schematic views for illustrating a divergence angle controlling unit according to another embodiment.
Figure 6B:
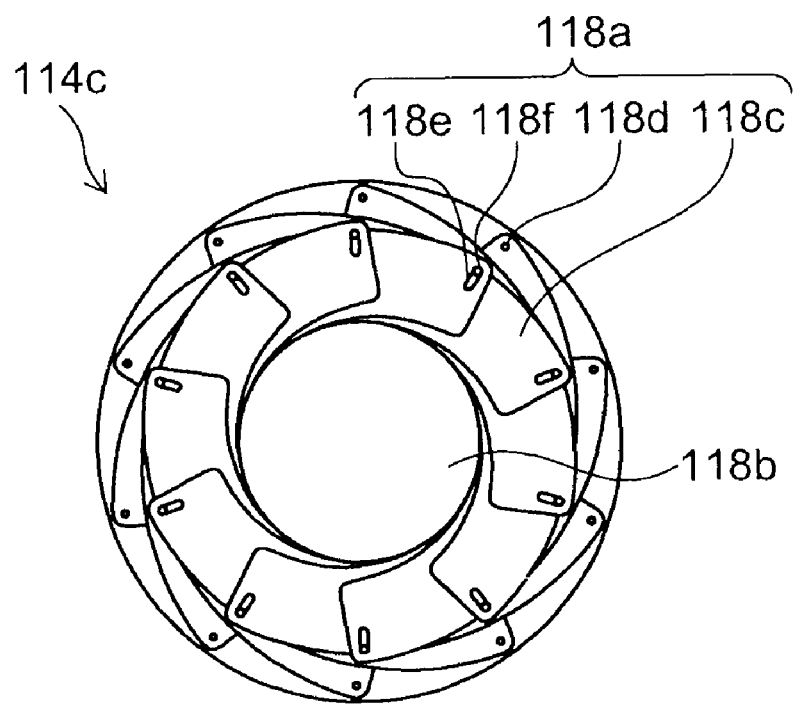

FIGS. 6A and 6B are schematic views for illustrating a divergence angle controlling unit according to another embodiment. FIG. 6A is a schematic cross-sectional view for illustrating the divergence angle controlling unit, and FIG. 6B is a fragmentary view taken in the direction of the arrows D-D of FIG. 6A. FIGS. 6A and 6B illustrate the case where the value of the divergence angle is controlled variably.

As illustrated in FIGS. 6A and 6B, a divergence angle controlling unit 114c includes a light shielding unit 118a and a transmission unit 118b. The light shielding unit 118a is formed of an opaque such as metal, and shields part of the light flux 112 emitted from the projection unit 113. The light shielding unit 118a is formed by mutually superposing a plurality of plate-like bodies 118c. Each plate-like body 118c is configured to be capable of rotationally-moving about a support unit 118d. An elongate hole 118e is provided on a side opposite to the side provided with the support unit 118d. A movable pin 118f is inserted in the elongate hole 118e. Each plate-like body 118c rotationally-moves about the support unit 118d according to the position of the movable pin 118f. Consequently, by the rotational-movement of each plate-like body 118c, the cross-section-direction dimension of the transmission unit 118b changes. A driving unit 119 is provided which changes the position of the movable pin 118f, and the not-illustrated driving unit and the control unit 140 are electrically connected to each other. In the present aspect, the not-illustrated driving unit serves as a cross-section dimension changing unit that changes the cross-section-direction dimension (cross-section dimension in a direction generally orthogonal to the direction of the light flux). The dimension, shape, number, layout position, and the like of the plate-like body 118c, the support unit 118d, the elongate hole 118e, and the movable pin 118f are not limited to those illustrated, but may be modified as appropriate.

The cross-section-direction dimension of the transmission unit 118b is controlled to smaller than the cross-section dimension of the light flux 112 emitted from the projection unit 113 in the direction orthogonal to the axis of the light flux 112. Therefore, the light flux 112 emitted from the projection unit 113 is partly shielded by the light shielding unit 118a. Part of the light flux 112 passes through the transmission unit 118b, and is emitted toward the first mirror 122.

The divergence angle decreases by shielding part of the light flux 112 emitted from the projection unit 113. More specifically, the divergence angle θ2 at the time of passing through the transmission unit 118b is smaller than the divergence angle θ1 at the time of being emitted from the projection unit 113. The divergence angle θ2 at the time of passing through the transmission unit 118b can be changed by changing the cross-section-direction dimension of the transmission unit 118b. Therefore, the divergence angle θ2 can be made not more than a prescribed angle, by driving the not-illustrated driving unit based on an electrical signal from the control unit 140 to rotationally-move each plate-like body 118c. In this case, the occupant 100 may recognize the state of the optical image of image information and input necessary information into the control unit 140, also by which the cross-section-direction dimension of the transmission unit 118b can be controlled to an appropriate value.

Thus, by making the divergence angle θ2 not more than the prescribed angle, the optical image of image information can be prevented from being viewed as a double image. The present aspect can control the divergence angle θ2 to not more than a prescribed angle even when the condition for installation of the display device 10 or the like changes.

The optical image can be prevented from being viewed as a double image by configuring the dimension and arrangement of each element provided on the display device 10 appropriately.

Figure 7:
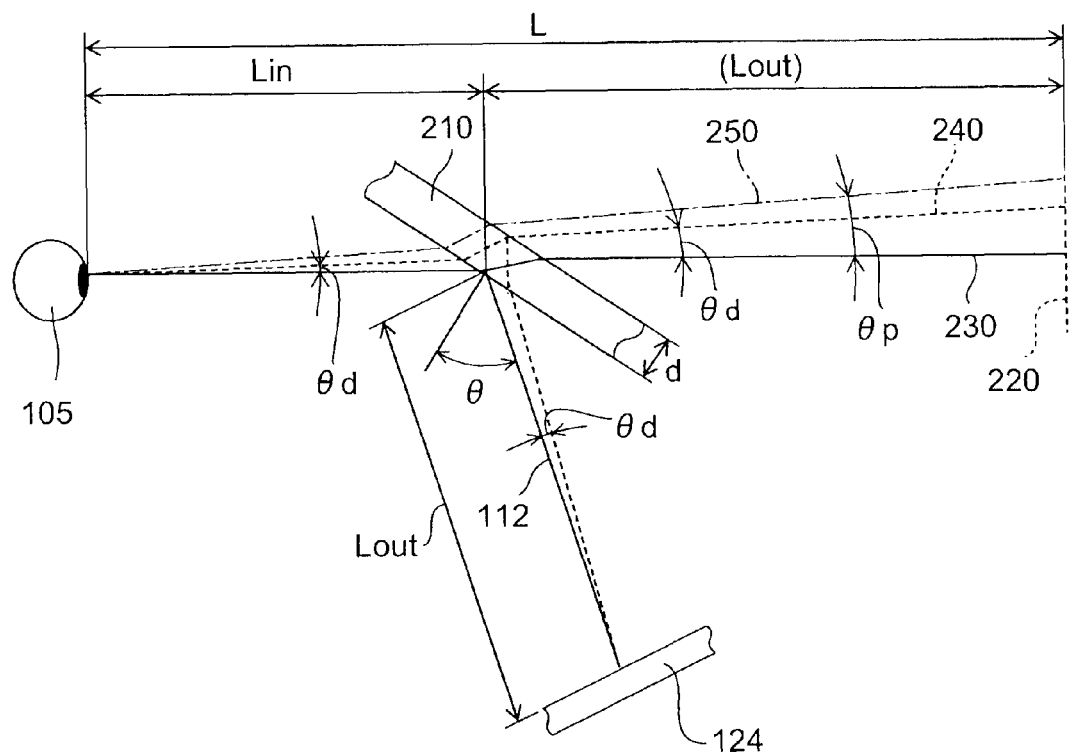
FIG. 7 is a schematic view illustrating a condition for preventing from being viewed as a double image.

FIG. 7 is a schematic view illustrating a condition for preventing from being viewed as a double image.

For example, the eyesight required for Japanese ordinary vehicles class 1 license is not less than 0.3 for one eye and not less than 0.7 for both eyes. In this case, the angle resolution corresponding to the one eye eyesight 0.3 is generally 1 mrad.

Therefore, when the head-up display (HUD) is formed by mounting the display device on a vehicle and by using a windshield as the projection plate 210, the optical image of the image information can be prevented from being viewed as a double image by making an angle θd between a direction 230 of the virtual image and a direction 240 in which the double image can be viewed less than the angle resolution corresponding to the one eye eyesight 0.3. More specifically, in such a case, it is only necessary that the angle θd between the direction 230 of the virtual image and the direction 240 in which a double image can be viewed is generally 1 mrad or less.

Here, as shown in FIG. 7, when a refractive index of the projection plate 210 is n, a thickness is d, a distance from the eye 105 of the occupant 100 to the virtual image face 220 is L, and an incident angle of the light flux 112 to the projection plate 210 is θ, the angle θd between the direction 230 of the virtual image and the direction 240 in which a double image can be viewed comes to be approximately θd=d sin 2θ/nL.

In more detail, when a distance from the eye 105 of the occupant 100 to the projection plate 210 is Lin, and a distance from the second mirror 124 (real image face) to the projection plate 210 is Lout, a distance L from the eye 105 of the occupant 100 to the virtual image face 220 comes to be L=Lin+Lout. The angle θd between the direction 230 of the virtual image and the direction 240 in which a double image can be viewed can be expressed by the following equation (1).

Here, when θ is sufficiently small (sin θ≈tan θ is valid), θd=d sin 2θ/nL described above can be used.

$$\theta_d = \frac{2d \cdot \cos\theta \cdot \sin\theta}{L\sqrt{n^2 - \sin^2\theta}} \quad (1)$$

Thus, the optical image of the image information can be prevented from being viewed as a double image by making the dimension relationship between respective elements satisfied with the angle θd of generally 1 mrad or less. If the divergence angle is set to be the prescribed angle described above or less, and the dimension relationship between the respective elements is satisfied with the angle θd between the direction 230 of the virtual image and the direction 240 in which a double image can be viewed of generally 1 mrad or less, the optical image of the image information comes to be further prevented from being viewed as a double image.

When a seeing angle as viewed from an eye point with respect to a portion corresponding to one pixel in the virtual image is θp, the optical image of the image information comes to be further prevented from being viewed as a double image by making the angle θd not more than generally θp.

Moreover, if the divergence angle is set to be not more than the prescribed angle described above, and the angle θd is set to be not more than generally θp, the optical image of the image information comes to be further prevented from being viewed as a double image.

Here, in the case where a pixel of the image information is large (resolving power is low), the angle θd is easy to be not more than generally θp, thus the range of the divergence angle described above can be large in comparison with the case where the pixel of the image information is small (resolving power is high). As a result, the illumination region can be broadened.

Next, the operation of the display device 10 according to this embodiment will be illustrated.

First, as illustrated in FIG. 1, the light flux 112 is emitted from the projection unit 113 toward the divergence angle controlling unit 114 based on an electrical signal from the control unit 140. The light flux 112 emitted from the projection unit 113 includes image information.

Part of the light flux 112 having entered the divergence angle controlling unit 114 is shielded by the light shielding unit of the divergence angle controlling unit 114, and part thereof passes through the transmission unit of the divergence angle controlling unit 114. At this time, the divergence angle can be controlled by shielding part of the light flux 112 emitted from the projection unit 113.

The light flux 112 of which the divergence angle has been controlled by the passing of the light flux 112 through the divergence angle controlling unit 114 undergoes a directional change by the first mirror 112 to enter the second mirror 124. The light flux 112 having entered the second mirror 124 is reflected thereon to be emitted toward the lens 126. The light flux 112 having entered the lens 126 is collected, and then reaches the illumination region 112a via the projection plate 210.

At this time, the position of the second mirror 124 is controlled by the driving unit 125 based on an electrical signal from the control unit 140. Then, the position of the illumination region 112a is adjusted to the position of a specific region (in particular, the position of the one eye 105) of the occupant 100.

When the position of the specific region (in particular, the position of the one eye 105) of the occupant 100 moves, the position of the second mirror 124 is controlled based on an electrical signal from the control unit 140. In this case, the position of the specific region (in particular, the position of the one eye 105) of the occupant 100 is analyzed by the image detecting unit 130 described above. That is, the image 101 of the occupant 100 is taken by the imaging unit 150 via the projection plate 210, the lens 126, the second mirror 124, the first mirror 122, and the adjusting lens 151. The data of the image taken by the imaging unit 150 undergo image processing by the image processing unit 160. The position of the second mirror 124 is controlled based on the analysis data obtained by performing the image processing.

Various types may be used as the projection unit 113 in addition to the illustrated projectors. For example, a combination may be used of various kinds of light sources such as a laser, LED (light emitting diode) and halogen lamp, and optical elements such as a movable mirror and MEMS which scan a light flux generated by the light sources. Further, various kinds of light sources and an optical switch such as an LCD (liquid crystal display) may be combined. Furthermore, various forms of displays may be used such as a CRT (cathode ray display), VFD (vacuum fluorescent display), PDP (plasma display panel), EL (electroluminescence) display apparatus, and organic EL display apparatus.

Various kinds of optical elements may be used also for the light flux controlling unit 120. For example, a flat-plate mirror, prism, Fresnel lens, and the like which reflect, refract, and/or semi-transmit a light flux may be used. Further, various kinds of lenses, apertures, lenticular sheets, holographic diffusers, diffusing screens, microlens arrays, graded-index-type microlenses, prism sheets and louver sheets, alignment of a plurality of wave guide tubes with a shape of top truncated triangular pyramid, and the like may be used. The various kinds of optical elements mentioned above may be combined as appropriate.

Some of the optical elements included in the light flux generating unit 110 and the light flux controlling unit 120 may be shared. Further, optical elements included in the light flux generating unit 110 and the light flux controlling unit 120 may be mixed-disposed on the optical axis of the light flux 112. That is, these optical elements may be shared, replaced, and/or removed to the extent of technical feasibility.

If the position of the illumination region 112a is limited to the region of an eye, then improved display brightness, reduced power consumption, and enhanced lifetime of light source can be obtained. However, in the case where the position of the illumination region 112a is limited to only the region of an eye, it is necessary for the light flux 112 to enter properly the position of the eye 105 of the occupant 100. In particular, in the case where the position of the illumination region 112a is limited to a small region of one eye only, a deviation of the positions of the illumination region 112a and the one eye may impair visibility of the display.

According to this embodiment, the position of the eye 105 of the occupant 100 can be analyzed by the image processing unit 160, and the light flux can be caused to enter in accordance with the position. In the case where, for example, the display device 10 is provided in a control compartment of a mobile apparatus such as a vehicle, the light flux 112 can be caused to enter properly the position of the eye 105 in accordance with the height of the occupant 100 (an operator) and the like. Further, even in such cases as where the occupant 100 moves his head from side to side and up and down, the light flux 112 can be caused to follow those movements. Consequently, the display can continue to be viewed. Furthermore, since the position of the illumination region 112a can be limited to the region of the eye 105, a display with high brightness and high visibility can be provided. Moreover, power consumption can be reduced, and the lifetime of light source can be enhanced. A great effect can be obtained in such cases as where the light flux 112 is caused to enter only the one eye 105 of the occupant 100.

Since the divergence angle of the light flux 112 emitted from the projection unit 113 can be made not more than a prescribed angle by the divergence angle controlling unit 114, the optical image of image information can be prevented from being viewed as a double image. Therefore, display quality and visibility can be further improved. In this case, since it is unnecessary to make the shape of the projection plate 210 in the thickness direction a unique shape or to provide a special film, a display device with a low cost and high versatility can be provided.

Figure 8:
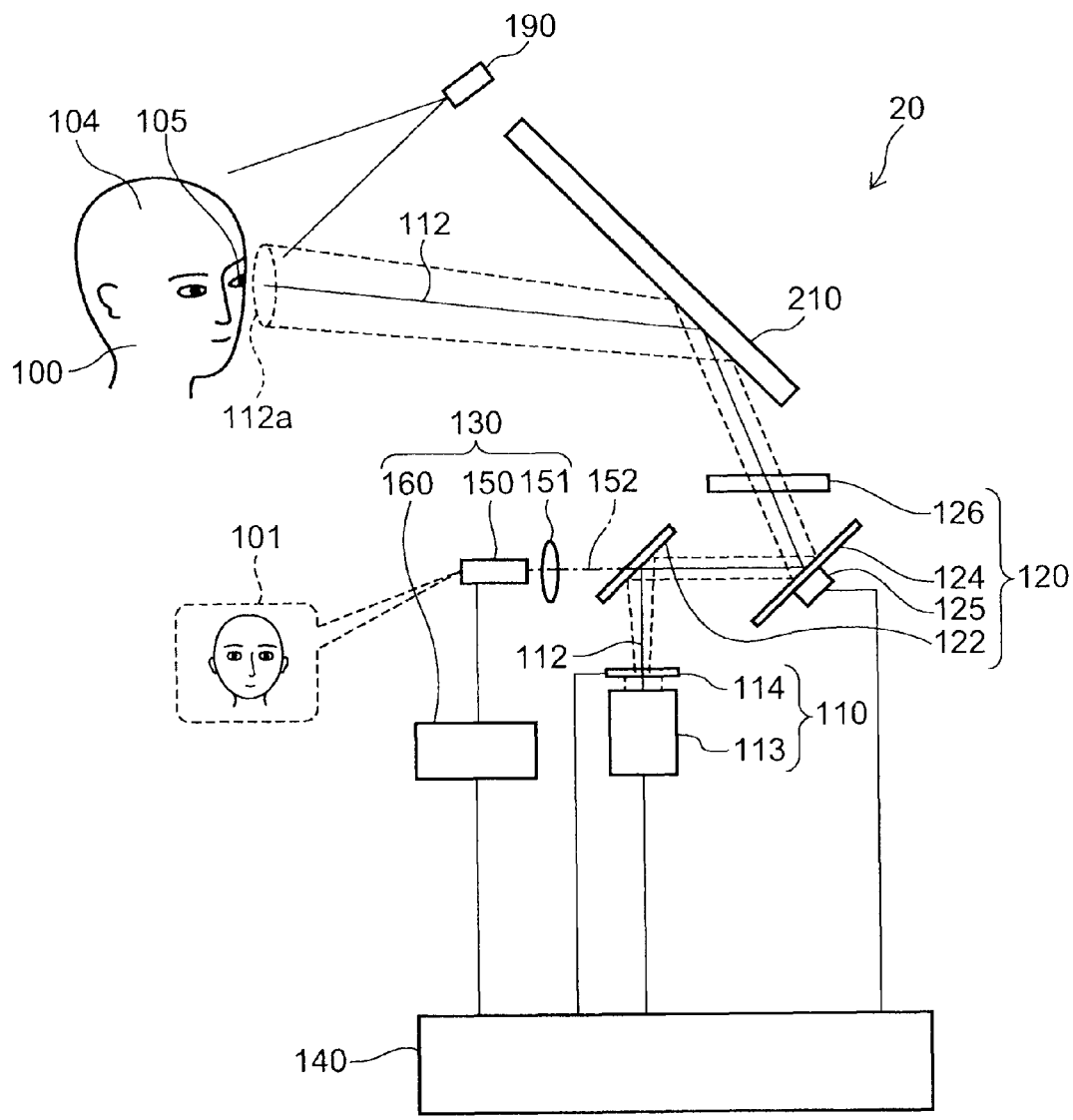
FIG. 8 is a schematic view for illustrating a display device according to a second embodiment.

FIG. 8 is a schematic view for illustrating a display device according to a second embodiment.

As illustrated in FIG. 8, a display device 20 further includes an infrared LED (light emitting diode) 190 illuminating the occupant 100. Therefore, the image 101 of the occupant 100 can be taken stably even in darkness such as during nighttime.

Thereby, the display device 20 can analyze stably the position of a specific region (in particular, the position of the eye 105) of the occupant 100 even in darkness. The light flux can be caused to enter stably in accordance with the position of the specific region (in particular, the position of the eye 105) of the occupant 100. The display device 20 is preferably used for a head-up display (HUD) used at night as well. The light source illuminating the occupant 100 may be other than an infrared LED (light emitting diode), and various kinds of lamps and the like may be used therefor.

Figure 9:
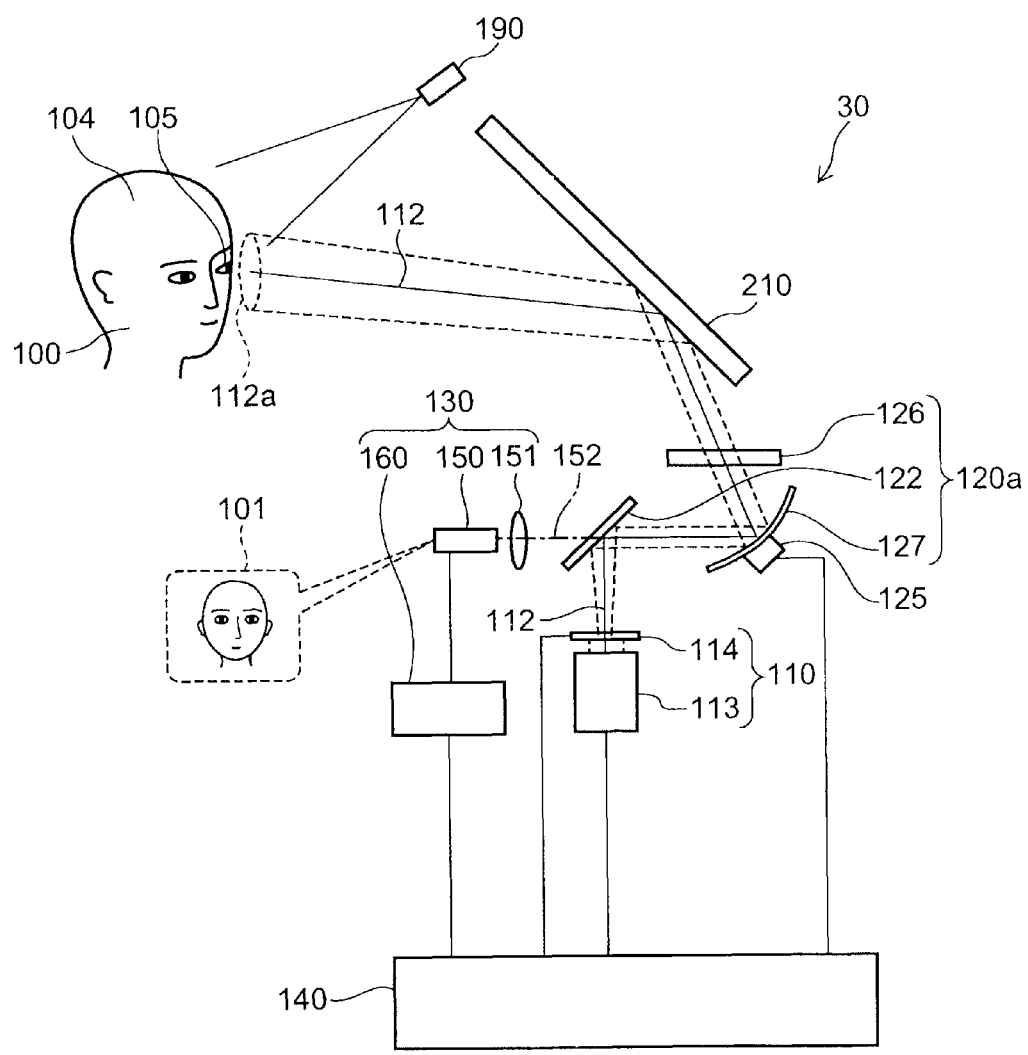
FIG. 9 is a schematic view for illustrating a display device according to a third embodiment.

FIG. 9 is a schematic view for illustrating a display device according to a third embodiment.

As illustrated in FIG. 9, a display device 30 includes a light flux controlling unit 120a. The light flux controlling unit 120a includes a concave mirror 127. The concave mirror 127 is provided in place of the second mirror 124 of the display device 20 illustrated in FIG. 8. The driving unit 125 is connected to the concave mirror 127. The position of the concave mirror 127 can be changed by the driving unit 125. The position of the illumination region 112a can be changed by changing the position of the concave mirror 127. For example, the position of the illumination region 112a can be changed in the horizontal and vertical directions by changing the angle etc. of the concave mirror 127. The position of the illumination region 112a can be controlled also by the curvature of the concave mirror 127. Therefore, the position of the illumination region 112a can be controlled more efficiently. Further, display devices can be downsized.

The display device 30 can make the position control for the illumination region 112a more efficient, and downsize display devices. Further, the position and pint of the illumination region 112a with respect to the occupant 100 can be controlled with high accuracy. Furthermore, a display device with high brightness and good visibility can be provided.

Figure 10:
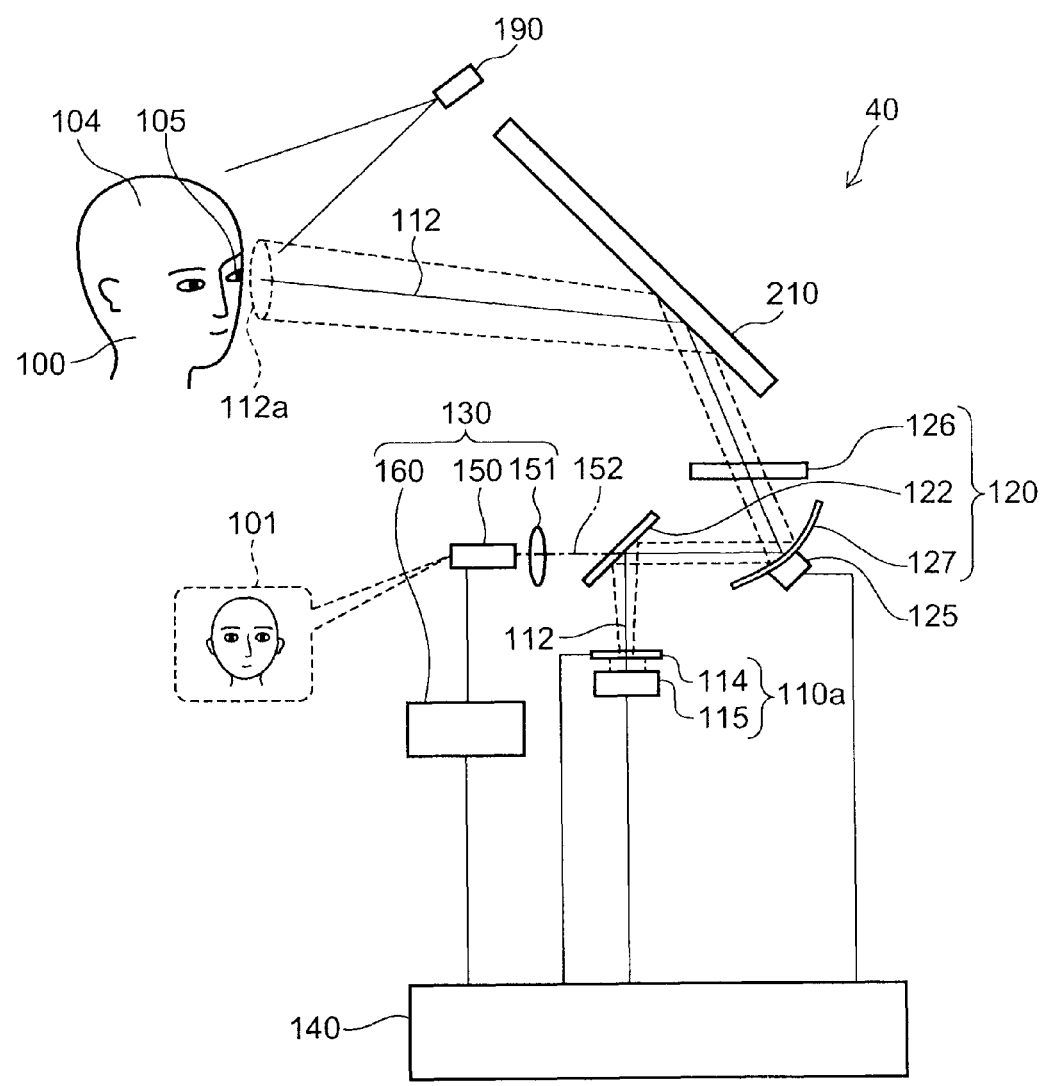
FIG. 10 is a schematic view for illustrating a display device according to a fourth embodiment.

FIG. 10 is a schematic view for illustrating a display device according to a fourth embodiment.

As illustrated in FIG. 10, a display device 40 includes a light flux generating unit 110a. The light flux generating unit 110a includes a liquid crystal display device 115 provided with backlight as a projection unit. The divergence angle controlling unit 114 is provided opposed to the display face side (the side from which a light flux is emitted) of the liquid crystal display device 115. Such a configuration can downsize the display device 40.

Figure 11:
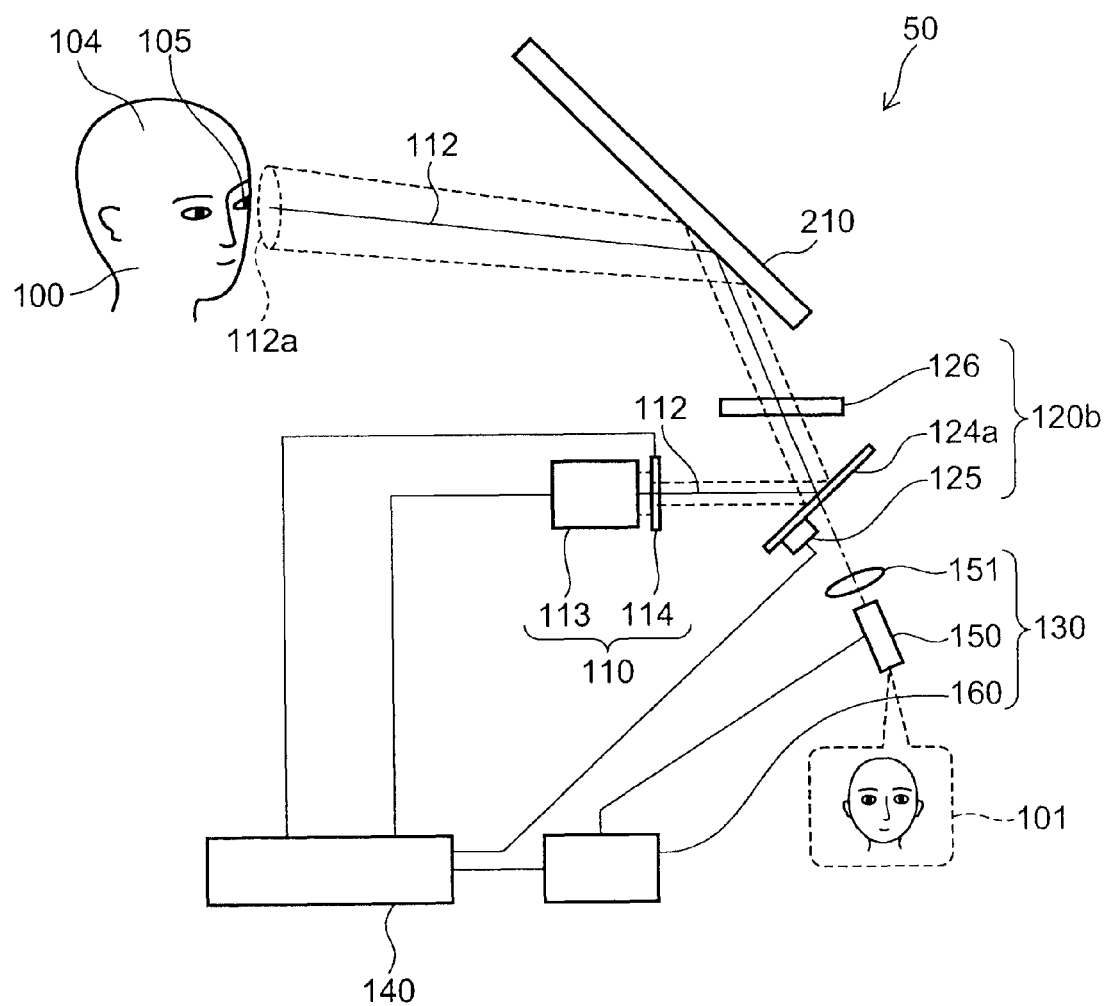
FIG. 11 is a schematic view for illustrating a display device according to a fifth embodiment.

FIG. 11 is a schematic view for illustrating a display device according to a fifth embodiment.

As illustrated in FIG. 11, a display device 50 includes a light flux controlling unit 120b. The light flux controlling unit 120b includes a second mirror 124a which can reflect part of an incident light flux and transmit part thereof. An imaging unit 150 is provided on the back side of the second mirror 124a. Therefore, the imaging unit 150 can take the image 101 of the occupant 100 which has been obtained by passing through the second mirror 124a.

In this case, it is preferable that the second mirror 124a can reflect visible light and transmit infrared light. Further, it is preferable that the imaging unit 150 can take the image 101 of the occupant 100 with infrared light. Such a configuration can reduce unnecessary noise in the image.

Although cases where the imaging unit 150 is provided on the back side of the first mirror 122 or the second mirror 124a are illustrated in the embodiments described above, it is enough to provide the imaging unit 150 at a position capable of taking the image 101 on the extension of the optical axis of the light flux 112. Further, the imaging unit 150 may be provided at a position, for example, capable of directly imaging the occupant 100.

In the case where the display device according to each embodiment described above is used in a state where, for example, the posture for viewing is nearly fixed as in the case of a head-up display (HUD), the illumination region 112a may have a vertically-long shape (a shape long in a generally-vertical direction). Such a configuration can make it possible for the position adjustment between the position of the eye 105 and the position of the illumination region 112a to be performed only in the horizontal direction. This facilitates the position control for the illumination region 112a, which can make the device user-friendly, and reduce cost.

The projection plate 210 illustrated in the display device according to each embodiment described above may be a windshield or the like provided in a mobile apparatus such as a vehicle. In the case where a windshield or the like serves as the projection plate 210, various kinds of image information (for example, operating information and the like) can be displayed on the windshield or the like together with the image of the background field outside the windshield or the like. Therefore, an operator can visually identify the image information without moving the line of sight considerably.

Next, movable bodies according to the embodiments will be illustrated.

Figure 12:
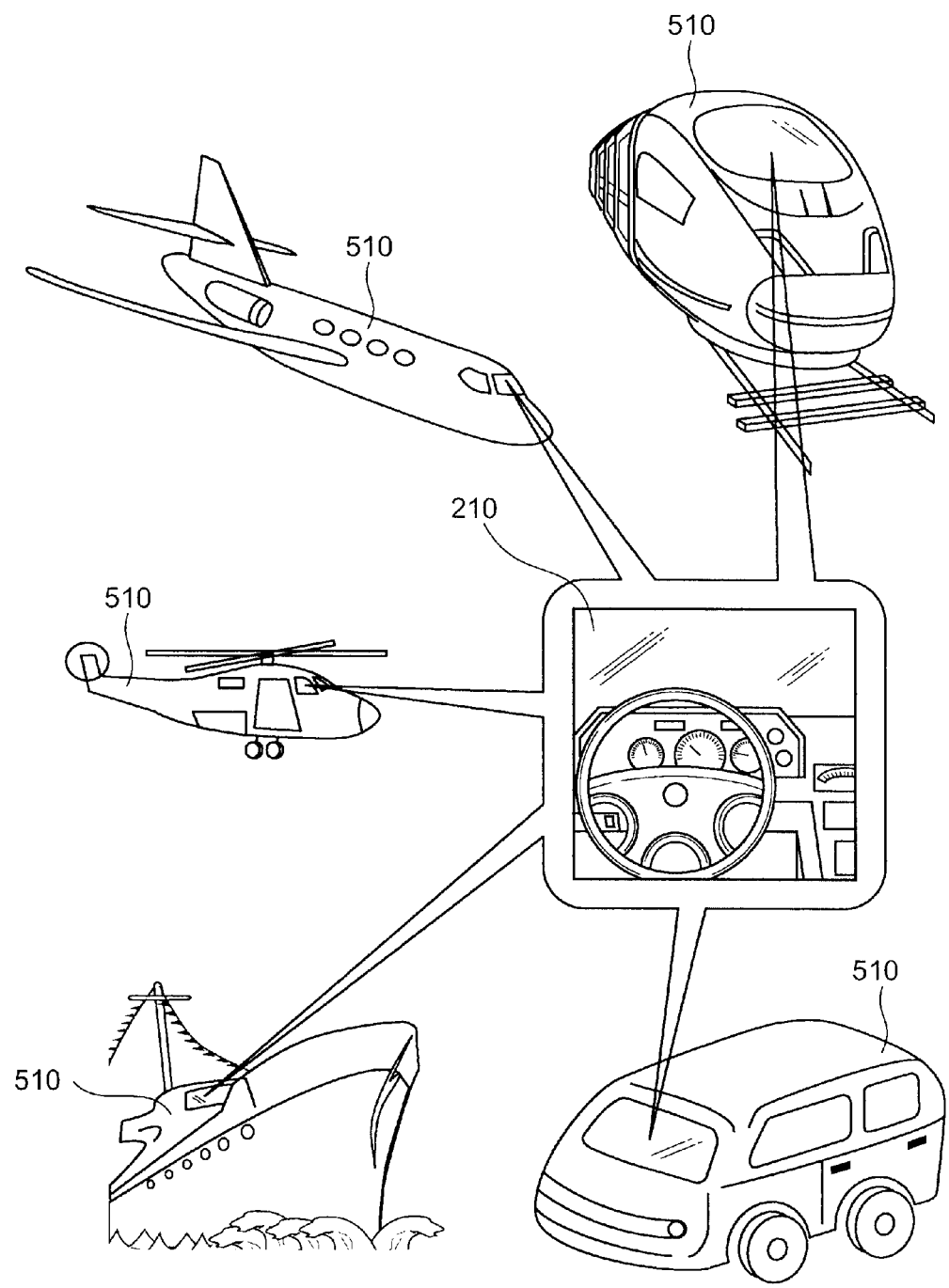
FIG. 12 is a schematic view for illustrating movable bodies according to the embodiments.

FIG. 12 is a schematic view for illustrating the movable bodies according to the embodiments.

As illustrated in FIG. 12, a window, for example, of various kinds of movable bodies 510 such as a vehicle, train, ship, helicopter, and aircraft may be used as the projection plate 210. That is, a mobile apparatus can be configured including: the display device according to the embodiments; and the projection plate 210 onto which various kinds of image information (for example, operating information and the like) are projected by the display device.

According to the embodiments, the position of an eye of the occupant 100 can be analyzed by the image processing unit 160, and a light flux can be caused to enter in accordance with the position. In this case, since the divergence angle of the light flux 112 emitted from the projection unit 113 can be made not more than a prescribed angle by the divergence angle controlling unit 114, the optical image of image information can be prevented from being viewed as a double image. Further, since it is unnecessary to make the shape of the projection plate 210 in the thickness direction a unique shape or to provide a special film, the device can be matched with various kinds of movable bodies 510 at low cost. Therefore, a high level of visibility can be obtained, and thereby a safe mobile apparatus capable of being operated with high efficiency can be provided.

Hereinabove, the embodiments are illustrated. However, the present invention is not limited to these descriptions.

One skilled in the art may appropriately perform design modification on the embodiments described above. Such modification also is included in the scope of the present invention to the extent that the spirit of the present invention is included.

For example, the shape, size, material, layout, number, and the like of components of the display device 10, the display device 20, the display device 30, the display device 40, the display device 50, and the like are not limited to those illustrated but may be modified as appropriate.

Furthermore, components of the embodiments described above may be combined within the extent of feasibility. Such combination also is included in the scope of the present invention to the extent that the spirit of the present invention is included.

The invention claimed is:

1. A display device comprising:
a projection unit configured to emit a light flux including image information;
a divergence angle controlling unit configured to control a divergence angle of the light flux emitted from the projection unit to not more than a prescribed angle; and
a transparent projection plate configured to reflect the light flux enabling an occupant to visually identify a virtual image locating in the reflection direction,
wherein
the divergence angle controlling unit includes a transmission unit transmitting the light flux emitted from the projection unit and a light shielding unit shielding part of the light flux,
the part of the light flux is shielded by the light shielding unit so that the divergence angle of the light flux is controlled to not more than a prescribed angle, and
an angle θd between a direction of the virtual image and a direction in which a double image is viewable, is not more than substantially 1 mrad, the angle θd represented by θd=d·sin 2θ/nL, where a refractive index of the projection plate is n, a thickness is d, a distance from an eye point position of the occupant to a position of the virtual image is L, and an incident angle of the light flux to the projection plate is θ.

2. The device according to claim 1, wherein the divergence angle controlling unit includes a plurality of transmission units having different cross-section dimensions in a direction generally orthogonal to a direction of the light flux, and a selection unit selecting an appropriate transmission unit from among the plurality of transmission units.

3. The device according to claim 1, wherein the divergence angle controlling unit includes a cross-section dimension changing unit changing a cross-section dimension in a direction generally orthogonal to a direction of the light flux of the transmission unit.

4. The device according to claim 1, wherein the divergence angle controlling unit controls the divergence angle to less than 2.8 mrad.

5. The device according to claim 1, wherein the divergence angle controlling unit controls the divergence angle so that an illumination region has a size in diameter of not more than eight millimeters at a position three meters distant from the projection unit along an optical path.

6. The device according to claim 1, further comprising:
an imaging unit taking an image of an occupant; and
a light flux controlling unit causing the light flux to enter a position of a specific region of the occupant based on the image taken.

7. The device according to claim 6, wherein the imaging unit takes the image on an extension of an optical axis of the light flux.

8. The device according to claim 6, wherein the imaging unit takes the image of the occupant directly.

9. The device according to claim 6, wherein the imaging unit takes the image with infrared light.

10. The device according to claim 6, wherein the light flux controlling unit controls the direction of the light flux to cause the light flux to enter the position of the specific region of the occupant.

11. The device according to claim 6, wherein the light flux controlling unit controls the direction of the light flux to cause the light flux to enter one eye of the occupant.

12. The device according to claim 6, wherein the light flux controlling unit includes a mirror changing the direction of the light flux by reflecting the light flux, and a driving unit changing a position of the mirror.

13. The device according to claim 12, wherein the driving unit changes an angle of the mirror.

14. The device according to claim 6, further comprising:
an image processing unit analyzing the position of the specific region of the occupant by performing image processing on the image taken.

15. The display device according to claim 6, further comprising:
a light source illuminating the occupant.

16. A display device comprising:
a projection unit configured to emit a light flux including image information;
a divergence angle controlling unit configured to control a divergence angle of the light flux emitted from the projection unit to not more than a prescribed angle; and
a transparent projection plate configured to reflect the light flux enabling an occupant to visually identify a virtual image locating in the reflection direction,
wherein
the divergence angle controlling unit includes a transmission unit transmitting the light flux emitted from the projection unit and a light shielding unit shielding part of the light flux,
the part of the light flux is shielded by the light shielding unit so that the divergence angle of the light flux is controlled to not more than a prescribed angle, and
an angle $\theta d$ between a direction of the virtual image and a direction in which a double image can be viewed being not more than generally 1 mrad, the angle $\theta d$ represented by equation:

$$\theta_d = \frac{2d \cdot \cos\theta \cdot \sin\theta}{L\sqrt{n^2 - \sin^2\theta}},$$

where a refractive index of the projection plate is n, a thickness is d, a distance from an eye point position of the occupant to a position of the virtual image is L, and an incident angle of the light flux to the projection plate is $\theta$.

17. The device according to claim 1 or 16, wherein the angle $\theta d$ is not more than generally $\theta p$, when a seeing angle as viewed from an eye point position with respect to a portion corresponding to one pixel in the virtual image is $\theta p$.

18. The device according to claim 1 or 16, wherein a distance L from the eye point of the occupant to the position of the virtual image is expressed by L=Lin+Lout, when a distance from an eye of the occupant to the projection plate is Lin, and a distance from a real image face to the projection plate is Lout.

19. A mobile apparatus comprising:
a display device including:
a projection unit configured to emit a light flux including image information;
a divergence angle controlling unit configured to control a divergence angle of the light flux emitted from the projection unit to not more than a prescribed angle; and
a transparent projection plate onto which image information is projected, the transparent projection plate configured to reflect the light flux enabling an occupant to visually identify a virtual image located in the reflection direction,
wherein
the divergence angle controlling unit includes a transmission unit transmitting the light flux emitted from the projection unit and a light shielding unit shielding part of the light flux,
the part of the light flux is shielded by the light shielding unit so that the divergence angle of the light flux is controlled to not more than a prescribed angle, and
an angle $\theta d$ between a direction of the virtual image and a direction in which a double image is viewable, is not more than substantially 1 mrad, the angle $\theta d$ represented by $\theta d = d \cdot \sin 2\theta / nL$, where a refractive index of the projection plate is n, a thickness is d, a distance from an eye point position of the occupant to a position of the virtual image is L, and an incident angle of the light flux to the projection plate is $\theta$.

* * * * *